United States Patent Office 3,347,255
Patented Oct. 17, 1967

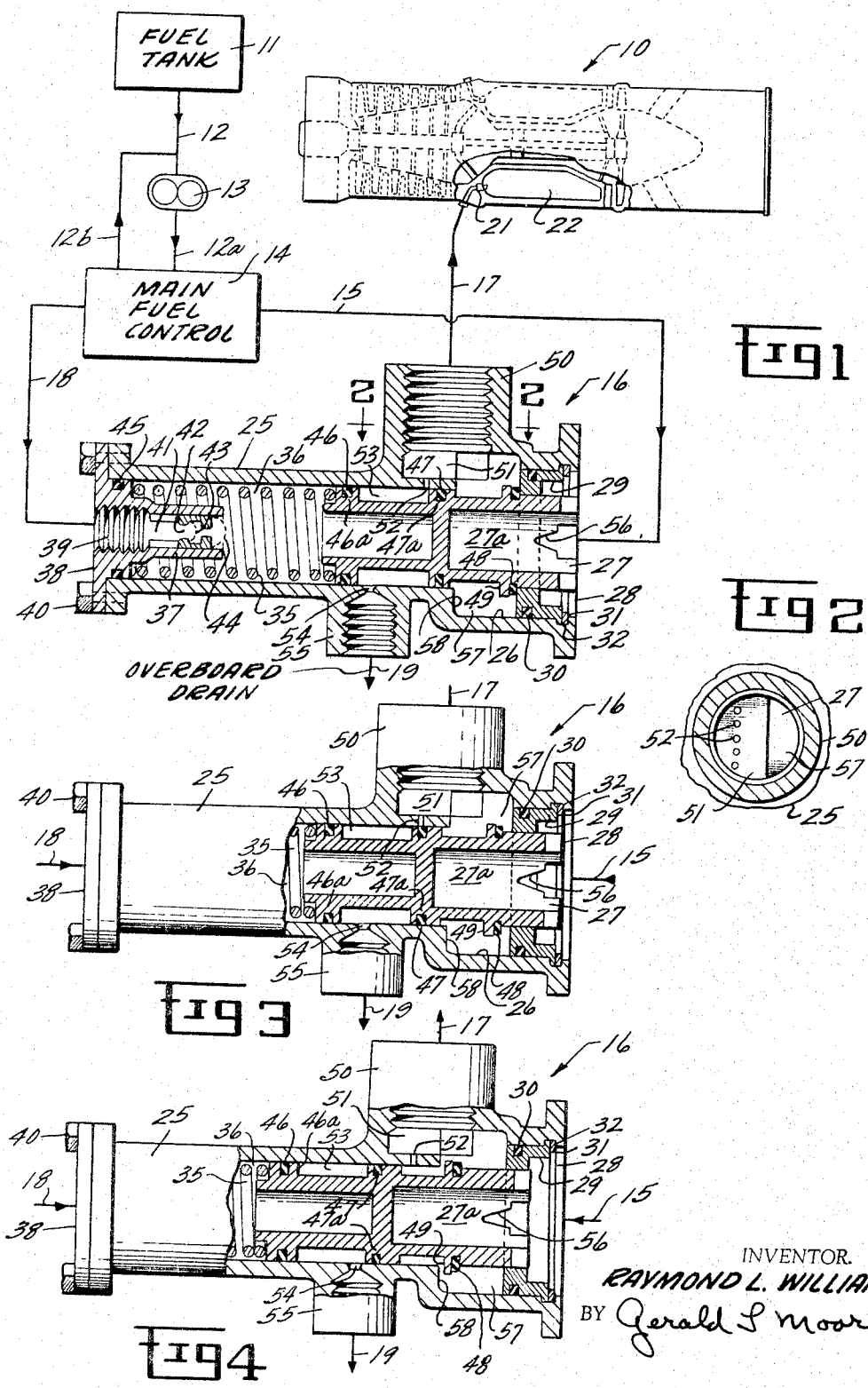

3,347,255
PRESSURIZING AND DRAIN VALVE
Raymond Leon Williams, Evendale, Ohio, assignor to General Electric Company, a corporation of New York
Filed May 29, 1964, Ser. No. 371,229
3 Claims. (Cl. 137—102)

This invention relates to thermal powerplant fuel systems and more particularly, to a fuel system pressurizing and drain valve to be utilized with aircraft gas turbine engines.

In the operation of present day turbojet aircraft, an ever present problem exists in the drainage of unburned fuel from the fuel injecting means upon engine shut-down. At the time of shut-down fuel collects in the combustion chambers as it drains from the fuel lines leading from the fuel source such that in the case of a restart, it may burn immediately to cause an over temperature condition within the combustion chamber. Such an over temperature condition may result in damage to the turbojet. Additionally it is necessary to maintain a minimum back pressure at the fuel metering valve since the control utilizes various metering orifices to control the fuel flow to the fuel injecting means in the engine combustor and also various servo systems are operated by the fuel pressure system. To accomplish the draining of excess fuel and the back pressurizing of the fuel metering valve there is commonly provided a pressurizing and drain valve in the fuel system between the metering valve and the fuel injecting means. However, since such valves must serve a dual function as well as provide reliable operation such valves have been quite complicated and expensive. Additionally problems have been encountered in providing satisfactory dynamic seals for the valves and, since fuel from the fuel injection means is drained back through the valve, the valves frequently must withstand the drain flow of contaminated fuel since the fuel system in the combustor region is subjected to higher temperatures which can result in the coking of fuel in the system. All of these factors multiply the problems of providing a reliable and uncomplicated pressurizing and draining system.

It is therefore the object of this invention to provide an improved pressurizing and drain valve for an engine fuel system.

Other objects and many of the attendant advantages of this invention will be readily appreciated as the same becomes better understood by reference to the following detailed description when considered in connection with the accompanying drawings wherein:

FIG. 1 illustrates the fuel supply pressurizing and drain system with the pressurizing and drain valve in the flow closed and drain open position, FIG. 2 is a cross-sectional view along the lines 2—2 of FIG. 1, FIG. 3 is a partial cross-sectional view of the valve illustrated in the flow closed and drain closed position, and FIG. 4 is a partial cross-sectional view of the valve in the flow open and drain closed position.

Referring now to the drawings therein is illustrated a turbojet engine 10 with the fuel system illustrated schematically comprising a fuel tank 11 with a fuel line 12 leading to the fuel pump 13. This pump supplies fuel under pressure to the main fuel control 14 through the fuel line 12a with the fuel control having a pump bypass line 12b leading back to the pump inlet. From the fuel control 14 which controls the quantity of fuel flow, fuel is supplied through line 15 to the pressurizing and drain valve 16 and from there to the turbojet engine 10 through fuel line 17. Additionally fuel line 18 leads from the main fuel control 14 to the valve 16 to supply a reference pressure to the valve the purpose of which will be explained later. Also leading from valve 16 is an overboard drain 19 which drains fuel from the engine manifold and fuel line 17 after fuel system is shut-down.

The fuel supplied to the turbojet 10 is fed to fuel nozzles 21 in the combustor 22 where the proper fuel air mixture is provided for combustion in the normal manner. As mentioned heretofore when the engine is shut-down, the main fuel control 14 cuts off the supply of fuel through the fuel line 15 and burning within the combustor 22 ceases. However, after shut-down some fuel remains in the fuel lines which if the turbojet is restarted can result in over heating and resulting damage to the turbojet structure since this fuel will burn immediately upon reinitiating combustion in the engine. The overheating may result from the fuel pooling within the combustor after draining from the fuel system after shut-down which when ignited, will quickly burn with the heat concentrated in a localized area where the fuel has collected. The pressurizing and drain valve 16 is provided to prevent this occurrence and in addition, provide a sufficient operating pressure within the lines 15 for proper functioning of the main fuel control 14. This back pressure is necessary since various servo systems are utilized within the main fuel control and in some occasions other controls upstream which demand a minimum operating pressure drop for proper functioning.

Referring now to the pressurizing and drain valve 16, the valve comprises a housing 25 in which is formed an internal valve cavity 26 machined directly from the valve housing forming the cavity in which a valve member 27 is positioned for oscillatory movement dividing the cavity into a plurality of chambers. The valve member 27 is inserted through a fluid intake passage or port 28 in one end of the housing through which the valve chamber may be machined with the valve member maintained there by a valve guide 29 positioned within this port 28. A seal 30 seals between the housing and the guide with the guide being maintained in the housing by a spring washer 31 fitting within a slot 32 in the housing.

The valve member 27 is yieldably urged towards the valve guide 29 by a spring 35 positioned within a reference pressure chamber 36 formed in one end of the valve cavity. This chamber is closed at one end by the valve member 27 and at the other by an orifice assembly 37 comprising an end plate 38 attached to the housing 25 by bolts 40 and including a fluid reference pressure port or fitting 39. A passage 41 forms an extension of the port 39 and includes a damping orifice 42 and fluid screens 43 and 44 to prevent foreign matter from entering the valve. A seal 45 positioned between the housing and the orifice assembly 37 seals the chamber to prevent fluid leakage. The reference pressure line 18 connects to the fluid fitting 39 to supply a reference pressure to the chamber 36 which with the spring 35 biases the valve member toward the valve guide 29. This reference pressure is generally received from the low pressure or exhaust side of the servo systems of the fuel control 14 and since as will be explained later, the valve member 27 is also subjected to an opposing force of the pressured fluid from the low pressure side of the servos, the positioning of the valve member is a function of the pressure drop across the servo systems thereby allowing the valve to effect the pressurizing function for which it is intended, i.e., the valve will maintain an established pressure difference fuel line 15 pressure over fuel line 18 pressure (inlet over reference) for as long as there is flow 15.

The valve member 27 is formed with an elongated body having seals 46 and 47 supported in grooves formed in collars 46a and 47a and extending between the valve member and the valve cavity wall. A seal 48 is positioned adjacent the extension 49 to contact the valve guide 29 for positive sealing between the valve member and the valve guide when the valve is in the position illustrated in FIG. 1. The pressurizing and drain valve 16 serves two functions with the pressurizing function explained heretofore. When the turbojet engine is shut-down the valve must also function to drain the fuel system of any excess fuel to prevent subsequent over temperaturing of the turbojet on restart. The valve in FIG. 1 is in the flow closed and drain open position; that is, no pressure fuel flow is being supplied through the fuel control 14 and therefore spring 35 and the force of the reference pressure fluid, if any is preesnt, causes the valve member 27 to move to the right until the seal 48 contacts the valve guide 29. The valve 16 is normally positioned below the combustion chambers 22 such that with the valve closed as illustrated fuel from line 17 may drain from the fuel line or lines 17 through the port 50 and the drain intake ports 52 to pass into a drain chamber 53. Drain intake ports 52 as illustrated in FIG. 2 open into this annular chamber 53 formed within the valve cavity by collars 46a and 47a extending around the valve member 27 such that fluid may pass around the exterior of the valve member between these collars and pass out through drain discharge ports 54 and a fitting 55 into the overboard drain 19 and be drained from the engine. The valve remains in this position so long as the fuel system is not actuated to provide fuel to the engine since in the absence of sufficient fluid pressure in line 15 the spring 35 will urge the valve member 27 into the position illustrated in FIG. 1. The ports 52 are made small and positioned within the fitting 50 to simplify external connections to the valve and also allow fuel in passing from the valve to the fuel line 17 to clear these openings by washing away any contaminate that may be trapped there. Where the fuel drains from the fuel liner extending to the combustion chambers the likelihood of the fuel containing contaminates is increased due to coking of the fuel in the heated fuel lines, and the small size of the openings 52 prevent such contaminates from draining back into the valve. Also since these ports are formed in a portion of the wall of the port 50 the manufacturing of the valve is simplified. Additionally, the use of small openings simplifies the functioning of the dynamic seal 47 since the passage of this seal over such openings does not wear or distort the seal in the manner that normally would occur if these openings were larger.

Upon actuation of the engine control to start the engine the pump 13 will be operated to provide pressured fuel to the main fuel control 14 which will subsequently pass through the fuel line 15. Pressured fuel from this line enters the valve cavity to exert a force on the valve member 27 within the chamber 27a of the member and when this force is sufficient to overcome the forces exerted by the reference pressure fluid within the chamber 36 and the force of the spring 35 acting on the valve member, the valve member will begin movement to the left within the valve chamber after a predetermined differential pressure has been generated. FIG. 3 illustrates the initial movement of the valve member at which time an extension 47a on the valve will move past the ports 52 to seal against fluid flow through the openings from the fitting 50 to the fitting 55 as normally occurs during the drain cycle of the valve, this position of the valve member is referred to as the flow closed and drain closed position. At the initial time that these drain intake ports 52 are closed the metering slot 56 has not yet cleared the valve guide 29 and the valve slot or slots 56 must clear the guide before fluid within the chamber 27a can flow into a chamber 57 within the valve which is in fluid communication with the cavity 51 and the fitting 50. Therefore when the valve member 27 is in the position illustrated in FIG. 3 fluid cannot flow either through the drain port of the valve or through the flow or metering port 56 of the valve. This allows the drain ports of the valve to be closed before fuel flow is initiated through the valve.

As the pressure within the line 15 builds, a greater force resulting from the pressure is exerted on the valve 27 to force it to the left until the valve member reaches the position illustrated in FIG. 4 wherein the metering slot 56 has now cleared the valve guide 29 sufficiently for fluid to pass from the cavity 27a into the cavity 57, the cavity 51 and out through the fitting 50 into the fuel line 17 and on to the turbojet fuel nozzles 21 of the combustor 22. This valve member position is referred to as the flow open and drain closed position. The valve member 27 will continue to move to the left under the force of the pressure from the fuel line 15 until the extension 49 encounters the face 58 within the valve cavity to prevent further movement of the valve member. While the valve member is in the position illustrated in FIG. 3 and FIG. 4, no fluid may pass through the drain ports 52 to the drain discharge ports 54 since the position of the extension 47a is such as to prevent fluid flow to the port 54. If the pressure within the fuel line 15 drops below a minimum fuel pressure, the force on the valve member caused by the fuel within the cavity 27a will be reduced while the spring force and reference pressure force in cavity 36 will remain somewhat constant thereby causing the valve member 27 to move back to the right until the pressure within the line 15 again rises. At this time the valve member will stabilize at a position within the valve cavity where the forces on the member are equal, while maintaining the desired pressure difference between inlet and reference pressures. The V configuration of the orifice or metering slot 56 allows a varying flow through the valve responsive to the valve member positioning. Subsequent to shutting off the fuel supply, pressure within the line 15 will drop to zero allowing the valve 27 to reassume the position illustrated in FIG. 1 at which time the drain ports 52 will again be in flow relation with the drain ports 54 to allow the excess fuel within the lines 17 to drain from the fuel system.

While particular embodiments of the invention have been illustrated and described, it will be obvious to those skilled in the art that various changes and modifications may be made without departing from the invention and it is intended to cover in the appended claims all such changes and modifications that come within the true spirit and scope of the invention.

What is claimed as new and desired to be secured by Letters Patent of the United States is:

1. A pressurizing and drain valve for use in a fluid supply system comprising a pressurized fluid source for supplying fluid to a manifold or the like and a reference presssure source, said valve comprising:

a housing having a bore formed in an integral portion thereof, a piston slidable in said bore and defining, in part, first and second chambers at opposite ends thereof, a valve guide mounted on said housing and slidably receiving the end of said piston defining said second chamber, a port for connecting said second chamber to said fluid pressure source and another port for connecting said first chamber to said reference pressure source, whereby the piston is urged toward a first position when the reference pressure force exceeds the pressurized fluid source on said piston, an annular chamber, within said housing, surrounding said piston and defined in part by the side of said guide towards the other end of said piston, a pressurized fluid outlet opening into said annular chamber and overlying a portion of the housing in which the bore is formed, at least one connecting passageway, within the outline of said outlet, connecting said outlet with said bore, a drain outlet opening into said bore at a point offset from said connecting passageway towards said other end of said piston, an annular groove formed in said piston and registering both with said connecting passageway and said drain outlet in said first piston position, said piston having a recess opening into said second chamber and an opening therethrough, said opening being blocked by said guide in said first piston position and connecting said pressurized fluid source with the outlet therefor when the piston is displaced towards its second position a distance sufficient to remove the piston groove from register with the connecting passageway.

2. A pressurizing and drain valve as in claim 1 wherein, the piston has an extension engageable within the annular housing chamber, said extension being engageable with said guide and said housing to limit piston travel.

3. A pressurizing and drain valve as in claim 2 wherein, said extension is formed circumferentially of said piston and forms, at least in part, means for providing a seal between the piston and the piston guide in the first piston position.

References Cited

UNITED STATES PATENTS

| | | | |
|---|---|---|---|
| 2,500,555 | 3/1950 | Majneri | 137—102 |
| 2,837,148 | 6/1958 | Jay | 158—36 |
| 2,929,394 | 3/1960 | Wenner | 137—107 |

WILLIAM F. O'DEA, *Primary Examiner.*

H. M. COHN, *Assistant Examiner.*

UNITED STATES PATENT OFFICE
CERTIFICATE OF CORRECTION

Patent No. 3,347,255                               October 17, 1967

Raymond Leon Williams

It is hereby certified that error appears in the above numbered patent requiring correction and that the said Letters Patent should read as corrected below.

Column 4, line 64, after "source" insert -- force --.

Signed and sealed this 5th day of November 1968.

(SEAL)
Attest:

Edward M. Fletcher, Jr.                            EDWARD J. BRENNER
Attesting Officer                                  Commissioner of Patents